United States Patent
den Besten

(10) Patent No.: US 11,115,264 B2
(45) Date of Patent: Sep. 7, 2021

(54) APPARATUSES AND METHODS INVOLVING MANAGING PORT-ADDRESS ASSIGNMENTS

(71) Applicant: NXP B.V., Eindhoven (NL)

(72) Inventor: Gerrit Willem den Besten, Eindhoven (NL)

(73) Assignee: NXP B.V., Eindhoven (NL)

( * ) Notice: Subject to any disclaimer, the term of this patent is extended or adjusted under 35 U.S.C. 154(b) by 6 days.

(21) Appl. No.: 16/457,069

(22) Filed: Jun. 28, 2019

(65) Prior Publication Data

US 2020/0412604 A1    Dec. 31, 2020

(51) Int. Cl.
| | |
|---|---|
| *H04L 12/24* | (2006.01) |
| *H04L 12/40* | (2006.01) |
| *H04L 29/12* | (2006.01) |
| *H04L 29/08* | (2006.01) |

(52) U.S. Cl.
CPC .............. *H04L 41/08* (2013.01); *H04L 12/40* (2013.01); *H04L 61/2069* (2013.01); *H04L 61/2517* (2013.01); *H04L 69/323* (2013.01)

(58) Field of Classification Search
CPC ....... H04L 41/08; H04L 12/40; H04L 69/323; H04L 61/2069; H04L 61/251
See application file for complete search history.

(56) References Cited

U.S. PATENT DOCUMENTS

| 5,982,741 A | 11/1999 | Ethier | |
|---|---|---|---|
| 2002/0085585 A1* | 7/2002 | Tzeng | ................ H04L 49/90 370/475 |
| 2003/0110344 A1 | 6/2003 | Szczepanek et al. | |
| 2015/0339253 A1 | 11/2015 | Chen et al. | |

FOREIGN PATENT DOCUMENTS

EP    0 853 405 A2    7/1998

OTHER PUBLICATIONS

IEEE Standard for Ethernet, IEEE 802.3-2018, Clauses 22 and 45 (abstract only).
Open Alliance, TC10 Wake-up and Sleep Specification for Automotive Ethernet.
Yue Lu, Kwangmo Jung, Yasuo Hidaka, Elad Alon, "Design and Analysis of Energy-Efficient Reconfigurable Pre-Emphasis Voltage-Mode Transmitters," in IEEE Journal of Solid-State Circuits, vol. 48, No. 8, Aug. 2013 (abstract only).

* cited by examiner

*Primary Examiner* — Dady Chery
(74) *Attorney, Agent, or Firm* — Rajeev Madnawat

(57) ABSTRACT

An example apparatus for a local area network. The apparatus includes, at one of a plurality of logic nodes, a plurality of ports and a plurality of shared registers. The plurality of shared registers have a port address table to provide configurable port-address assignments that identify respective ones of the plurality of ports. The apparatus further includes a management interface controller that communicates with the plurality of ports and accesses at least one register via a selected one of the ports, and in response configures or manages the port-address assignments within the port address table.

20 Claims, 11 Drawing Sheets

449

PORT ADDRESS MAP

| | |
|---|---|
| 00000 | |
| 00001 | |
| 00010 | |
| 00011 | |
| 00100 | |
| 00101 | BROADCAST TO PHYs IN DEVICE D |
| 01000 | |
| 01001 | |
| 01010 | |
| 01011 | |
| 01100 | |
| 01101 | BROADCAST TO PHYs IN DEVICE A |
| 10000 | |
| 10001 | |
| 10010 | |
| 10011 | |
| 10100 | |
| 10101 | BROADCAST TO PHYs IN DEVICE B |
| 11000 | |
| 11001 | |
| 11010 | |
| 11011 | |
| 11100 | |
| 11101 | BROADCAST TO PHYs IN DEVICE C |

PORT ADDRESS MAP 00000
00001 } USED FOR
00010 } DEVICE-SPECIFIC
00011 } BROADCAST ADDRESSING
00100
00101
00110
00111
00000
01001
01010
01011
01100
01101
01110
01111
10000
10001
10010
10011
10100
10101

APPARATUSES AND METHODS INVOLVING MANAGING PORT-ADDRESS ASSIGNMENTS

OVERVIEW

Aspects of various embodiments are directed to managing port-address assignments within a port address table of shared registers.

Local area networks (LANs) are a means by which many network modules or work stations are interconnected so as to share resources such as data and applications, providing considerable cost savings over, for example, a mainframe computer with multiple attached terminals, and providing other benefits as well. An example LAN arrangement is the so-called "Ethernet" LAN, which is defined by an industry compliant standard, namely, the Institute of Electrical and Electronic Engineer (IEEE) 802.3 standard. This standard allows network devices of various manufacturers, such as network interface cards (NICs), hubs, bridges, routers, and switches, to communicate packetized data with each other in the LAN. The IEEE 802.3 standard is defined in terms of the Open Systems Interconnection (OSI) reference model. This model defines a data communication system in terms of layers. Among the layers included in the OSI model are: (1) the physical layer (PHY), which specifies the electrical and coding characteristics of the transmission medium; (2) the medium access control (MAC) layer, which controls flow of data through the network; and (3) the network layer, which sets up connections between sources and destinations for data communicated in the network. Other layers include the transport layer, which is a protocol stack for transporting the data, and the application layer, such as a word-processor or spread sheet application.

These and other matters have presented challenges to efficiencies circuit implementations, for a variety of applications.

SUMMARY

Various example embodiments are directed to issues such as those addressed above and/or others which may become apparent from the following disclosure concerning managing and/or configuring port-address assignments using a port address table on shared registers.

In certain example embodiments, aspects of the present disclosure involve flexibly reassigning port addresses and broadcast addresses using a port address table on shared registers that are associated with a plurality of ports.

In a more specific example embodiment, an apparatus is for use in a local area network characterized by a plurality of network modules to convey data over a physical communication channel and with at least one of network modules including a management communications bus for communication among a plurality of logic nodes via a communications protocol. The apparatus comprising at one of the plurality of logic nodes, a plurality of ports to provide communications and a plurality of shared registers. The apparatus further includes a management interface (MI) controller which may form part of said one logic node or another of the plurality of logic nodes. The ports are coupled to circuits that implement functions in the network, such as physical layer circuits (PHYs) that implement physical layer functions in response communications transactions over the management communications bus. As further described herein, each of the plurality of logic nodes includes a slave logic node or a master logic node, with each slave logic node including one or more ports. The particular logic node may include a slave logic node having a plurality of ports, with one or more of the ports being associated with or coupled to PHYs that provide physical layer functions.

The plurality of shared registers have a port address table to provide configurable port-address assignments that identify respective ones of the plurality of ports. The port address table is used to manage a plurality of port addresses associated with the plurality of ports. The MI controller communicates with the plurality of ports and accesses at least one register of the plurality of shared registers via a selected one of the plurality of ports, and in response, configures or manages the port-address assignments within the port address table.

The port address table is stored on one or more of the shared registers. The apparatus may further include a master logic node of the plurality of logic nodes. The master logic node changes one of the port-address assignments within the port address table to broadcast, via the management communications bus, a communication to a plurality of addressable locations, wherein each of the addressable locations corresponds to one of the plurality of ports. In other embodiments and/or in addition, the change to one of the port-address assignments is to broadcast, via the management communications bus, a communication to a subset of the plurality of ports, to each of the plurality of ports, and/or ports associated with a plurality of logic nodes of the network module. Each of the plurality of ports has an initial port-address assignment and the master logic node may change at least a portion of the initial port-address assignments.

The master logic node changes the port-address assignment by communicating a write transaction to one of the port-address assignments associated with one of the plurality of ports and with the one or more of the shared registers on which the port address table is stored. The master logic node may change the port-address assignments associated with at least a first of the plurality of ports within the port address table to another port-address. The change may be to a previous used address (e.g., already existed in the port address table) or a new port address not yet used in the port address table. For example, each of the plurality of ports have an initial port-address assignment and the master logic node changes the initial port-address assignments by identifying a unique port address among the initial port-address assignments and changing at least one of the initial port-address assignments. A unique port address, as used herein, includes or refers to an address that is only used for one logic node in the network module. The unique port address may not be unique inside the particular logic node or is used more than once on the port address table but that is not used within another logic node of the network module. The master logic node is aware of all devices in the network module, and can identify respective unique port addresses for one or more logic nodes of the network module.

The master logic node configures the port-address assignments within the port address table via a communications transaction to the port-address assignment associated with one of the plurality of ports and associated with one or more of the shared registers on which the port address table is stored, the communications transaction being in accordance with the communications protocol and the communications protocol being compliant with an industry standard that defines an Ethernet-based local-area network (LAN) technology. For example, the master logic node changes the port-address assignment by communicating a write transaction to a port-address assignment associated with any of the plurality of ports. In specific embodiments, the master logic node manages the plurality of ports via a serial management interface (SMI) as specified by the communications protocol, by changing at least one of the port-address assignments within the port address table to broadcast, via the management communications bus, a communication to a plurality of addressable locations, each of the locations corresponding to one of the plurality of ports.

The apparatus may further include the management communications bus for communication among the plurality of logic nodes, and the plurality of logic nodes include a master logic node and a plurality of slave logic nodes. The one or more logic nodes include the master logic node and the one of the slave logic nodes having the plurality of ports, the shared registers, and the MI controller. The master logic node changes the port-address assignment by sending a write transaction to the slave logic node that identifies a port-address assignment associated with one or more of the plurality of ports, and the MI controller of the slave logic node communicates the write transaction to the one or more shared registers associated with the identified one or more ports. The apparatus may include each of the plurality of logic nodes, wherein each of the slave logic nodes includes respective one or more ports and a plurality of shared registers having a port address table to provide configurable port-address assignments to identify respective ones of the one or more ports. The MI controller changes at least one of the port-address assignments within the port address table to broadcast, via the management communications bus, a communication to a plurality of addressable locations, wherein each of the addressable locations corresponds to one of the plurality of ports of each of the slave logic nodes. In other embodiments and/or in addition, the change may be to broadcast, via the management communications bus, a communication to a subset of the plurality of ports of one or more of the slave logic nodes.

Other embodiments are directed to methods of using the above-described apparatuses. An example method is for using in a LAN characterized by a plurality of network modules configured to convey data over a physical communication channel and with at least one of the network modules including a management communications bus for communication among a plurality of logic nodes via a communications protocol. The method includes communicating over the management communications bus among the plurality of logic nodes. The method further includes, at one of the plurality of logic nodes and using logic circuitry, providing a port address table having port-address assignments which identify respective ones of a plurality of ports and one or more of a plurality of shared registers, the plurality of ports being associated with the plurality of shared registers, and accessing, via communication with one or more of the ports, at least one register associated with a selected one of the plurality of ports and configuring or managing the port-address assignments within the port address table. Accessing the one or more ports includes communicating a write transaction to one or more of the shared registers, wherein the one or more of the shared registers stores the port address table, and therein, changing at least one of the port-address assignments in the port address table associated with the plurality of ports. And, changing the at least one of the port-address assignments within the port address table may include selecting a broadcast address, via the management communications bus a communication, to a plurality of addressable locations corresponding to subsets of the ports among the plurality of logic nodes.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIGS. 4A-4B illustrate a specific example of managing port-address assignments and a port address table, in accordance with the present disclosure;

FIGS. 5A-5B illustrate another specific example of managing port-address assignments and a port address table, in accordance with the present disclosure;

Figure 1:
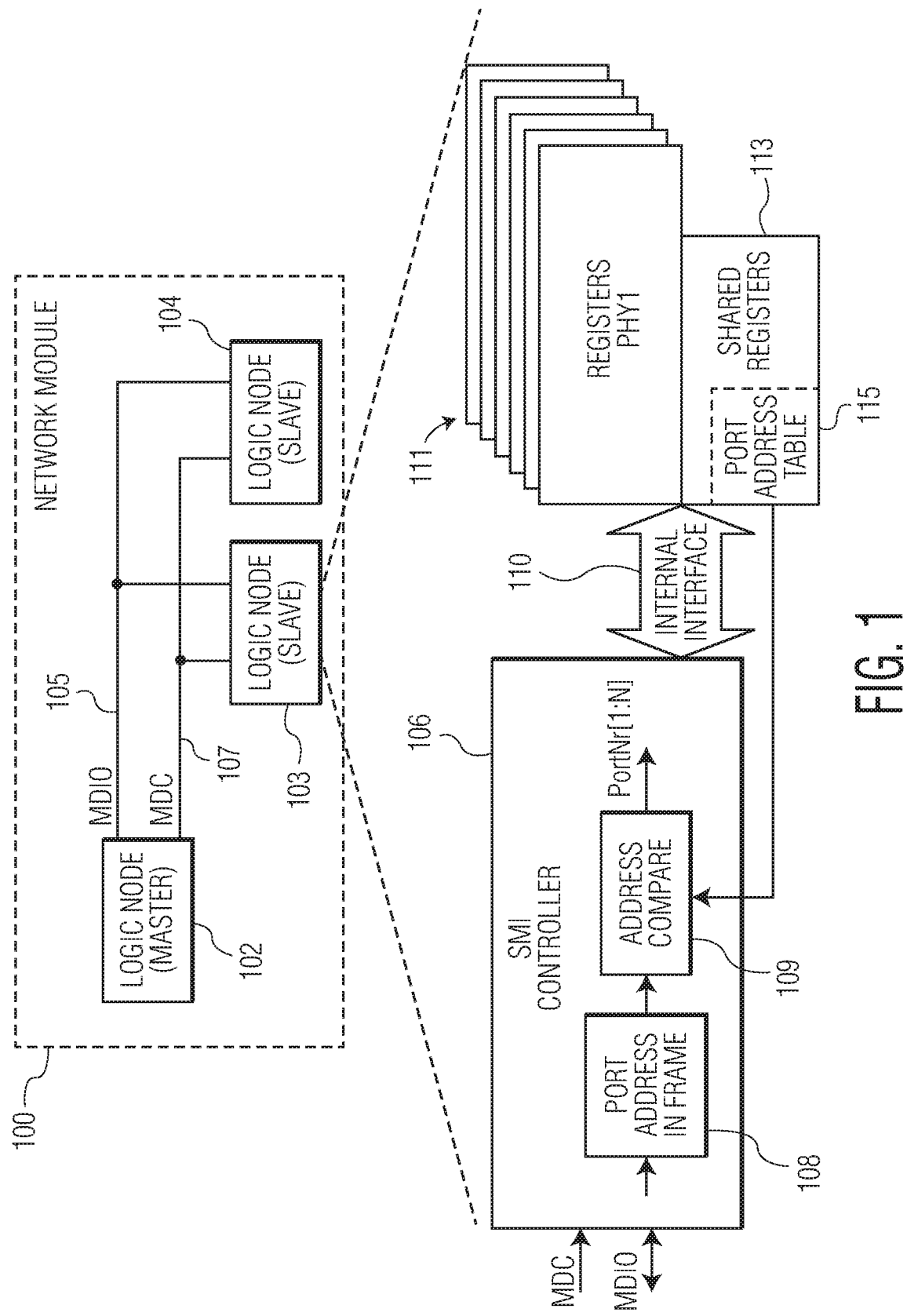
FIG. 1 illustrates an example apparatus for managing port-address assignments, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving managing and/or configuring port-address assignments using a port address table on shared registers. In certain example embodiments, aspects of the present disclosure involve flexibly reassigning port addresses and broadcast addressing using a port address table stored on shared registers that are associated with a plurality of ports. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various local area networks (LANs) allow network devices of various manufacturers, such as network interface cards (NICs), hubs, bridges, routers, and switches, to communicate packetized data with each other in the LAN. The communications include indirect access to memory, e.g., registers, in physical devices or circuits are in network modules of the LAN (e.g., via serial management interface (SMI) as further described herein). The physical devices, sometimes referred to as "PHYs," may use a register map for configuration, control, and status readout of associated registers. The PHYs are located on or include logic nodes. In many network modules, such as network modules within LANs, there are two types of logic nodes, a master logic node and slave logic nodes, each coupled to a management communications bus. The master logic node manages access to the management communications bus and initiates the communications with the slave logic nodes over the management communications bus using a communications protocol. The slave logic nodes may have an internal bus to couple internal PHYs and communicate over the management communications bus, with each slave logic node including one or more PHYs or subsystems. Each logic node may have one or more ports and each port has a corresponding port address such that the ports are separately addressable, with ports being coupled to a respective PHY (or other type of circuit or function). Generally, the port addresses for the ports and associated with the PHYs are set by pin-strapping and the master logic node is notified of the corresponding port addresses (e.g., programmed in software). Different slave logic nodes may be added to communicate over the management communications bus, and/or different port addresses may not be unique between ports of a respective to the slave logic node and/or the network module. Embodiments in accordance with the present disclosure are directed to apparatuses that flexibly manage port addresses of ports associated with PHYs or other types of functions on a respective network module by storing a port address table on a shared register, which allows for management of the port addresses including reassignment of respective port addresses. In addition, the port addresses may be managed such that the master logic node can broadcast a communications transaction to multiple PHYs or ports coupled to other types of functions, rather than to one specific port or function.

In specific embodiments, such as with single-master and multi-slave communication bus, each PHY has a unique port address that is addressable by the master logic node. A particular logic node may have one or more PHYs or sub-systems coupled to ports. The ports each have their own unique port address for being managed individually by the master logic node. Typically port addressing occurs by pin-strapping on the device. For fully flexible port-address assignments, a slave logic node may need five pin-straps for each port address. Embodiments in accordance with the present disclosure are directed to flexible port address and broadcast address assignments via the management communications bus, and that may be independent of pin strapping and using arbitrary port and broadcast addresses. Managing the port addressing via the management communications bus may reduce the number of pin-straps used and allow for greater flexibility in broadcast assignments, particularly with devices having multiple slave logic nodes and/or slave logic nodes having multiple PHYs and which may be different types of PHYs (e.g., provide different functions). The management communications bus is used to re-assign one or more of the port addresses by changing a port-address assignment associated with ports. The port-address assignments are on a table stored on shared registers, such that the table may be accessed using any of the ports. The reassignment may occur by identifying at least one unique address for a slave logic node having an associated port address table, and reassigning one or more of the port assignments until all are unique within the port address table for the slave logic node. For example, the reassignment occurs after a system boot, prior to which each of the ports may not have a unique port address. After the reboot, the master logic node identifies at least one unique address for the logic node and may use the unique address to reassign port addresses such that all ports have a unique address, and, optionally, to include one or more broadcast addresses.

Embodiments are not limited to PHYs and may include ports coupled to other types of functions and/or interfaces that provide communication. Specific embodiments are directed to an apparatus at one or more of the plurality of logic nodes that includes a plurality of ports and a plurality of shared register. The apparatus further include a management interface (MI) controller that may form part of said logic node, such as an internal-slave MI controller. The MI may include a serial MI (SMI), in specific embodiments. The plurality of logic nodes provide communication associated with the management communications bus, such as implementing network functions in response to a communications transaction over the management communications bus or other types of communication. The plurality of shared registers have a port address table stored thereon to provide configurable port-address assignments to identify respective ones of the plurality of ports, and which may be used to management a plurality of port address associated with the logic node of the network module. The MI controller (e.g., of a slave logic node) communicates with the plurality of ports of the logic node and accesses at least one register of the plurality of shared registers via a selected one of the plurality of port. In response to the access of the at least one register, the port-address assignments within the port address table are configured and/or otherwise managed. The master logic node changes the port-address assignment by communicating a write transaction to one of the port-address assignments associated with one or more of plurality of ports and with the one or more of the shared registers on which the port address table is stored. For example, each of the plurality of ports has an initial port-address assignment and the master logic node is to change the initial port-address assignments by identifying a unique port address among the initial port-address assignments and changing at least one of the initial port-address assignments.

A unique port address, as used herein, includes or refers to an address that is only used for one logic node in the network module. The unique port address may not be unique inside the particular logic node or is used more than once on the port address table but that is not used within another logic node of the network module. The master logic node is aware of all devices in the network module, and can identify respective unique port addresses.

In specific embodiments, the master logic node manages the plurality of other logic nodes (e.g., the slaves), such as via a SMI as specified by the communications protocol, the communications protocol being compliant with an industry standard that defines an Ethernet-based LAN technology. In such embodiments, the apparatus may further include the plurality of logic nodes including a master logic node and a plurality of slave logic nodes, and wherein the one (or more) of the slave logic nodes includes the plurality of ports, the shared registers, and the MI controller. The master logic node changes the port-address assignment by sending a write transaction to a port-address assignment associated with one or more of the plurality of ports of the slave logic node. The MI controller of the slave logic node communicates the write transaction to the one or more shared registers. The master logic node may change at least one of the port-address assignments within the port address table to broadcast, via the management communications bus, a communication to a plurality of addressable locations. Each of the addressable locations may correspond to all the ports of one of the slave logic nodes, to a subset of ports of one of the logic node sand/or to a subset of the ports of one or more of the slave logic nodes.

As provided above, the broadcast address may identify multiple ports across one or more slave logic nodes, such as PHYs or PHY subsystems, via the management communications bus. The broadcast is not restricted to a fixed address or specifically address 00000, and may include any unique port address that maps to the multiple ports, such as associated with PHYs and/or PHY subsystems in the port address table. A broadcast can be used if there is any port address available that is not used for a specific port address. Broadcast address re-assignment also enables using different broadcast addresses to reach different groups of PHYs among one or more of the devices within a network module.

In various embodiments, the communications protocol is in accordance with IEEE 802.3. The IEEE 802.3 specification defines two PHY register maps, one for each of Clause 22 and Clause 45. There is a register map defined in IEEE 802.3 Clause 22 for generations of Ethernet PHYs which contains up to thirty-two registers that are directly accessed via the management communications bus (e.g., management data input/output (MDIO)). As may be appreciated, one of the thirty-two registers may be used for indirect access, and does not involve a directly accessible register. There is another register map defined in IEEE 802.3 Clause 45 that is used for generations of Ethernet PHYs. This register map provides a larger register space than for Clause 22, which is sub-divided over multiple MDIO-managed devices (MMDs). Accessing the registers of these different Clauses requires different MDIO commands. For example, an MDIO access method for Clause 45 registers involves indirect addressing, which uses different MDIO commands than the access of Clause 22 registers which involves direct addressing. Both register maps include an IEEE-defined register address space and a vendor-specific register address space. Registers in the vendor-specific space can be assigned by the device manufacturer. Although the above describes an application for Ethernet SMI, embodiments can be applied to other applications.

Turning now to the figures, FIG. 1 illustrates an example apparatus for managing port-address assignments, in accordance with the present disclosure. The apparatus is for use in a LAN that is characterized by a plurality of network modules that convey data over a physical communication channel, such as media-independent interface connections connecting the network modules. Network modules consisting of multiple devices may include a management communications bus for communicating among a plurality of logic nodes within the network module via a communications protocol. Although one or more of the network modules of the LAN may not have a management communication bus, such as single device network modules. The communications protocol is compliant with an industry standard that defines an Ethernet-based LAN technology, such as IEEE 802.3. The apparatus, as shown by FIG. 1, may include or be associated with one of the plurality of network modules and/or one of the logic nodes 102, 103, 104.

As shown in FIG. 1, the network module 100 includes a plurality of logic nodes 102, 103, 104 and a management communications bus 105, 107 for communication among the plurality of logic nodes 102, 103, 104 in response to communications sent over the management communications bus 105, 107 (e.g., which as may be appreciated may include addresses for the slaves and not the master logic nodes). The management communications bus 105, 107 includes two lines, which are a clock line and data line, and respectively referred to as the management data clock (MDC) 107 and the MDIO 105. MDC 107 provides a full-rate clock signal from the master logic node 102 to the slave logic nodes 103, 104 to drive and slice bits on MDIO 105 during frames. The clock signal may stop during idle. MDIO 105 is a bi-directional bus with a tri-state driver in each logic node 102, 103, 104 and restive pull-up on the bus. The management communications bus 105, 107 allows for addressing the logic nodes 102, 103, 104 (e.g., the slave logic nodes 103, 104 as the master logic node 102 may not be addressed) by conveying node addresses (e.g., port and register addresses) over the management communications bus 105, 107 using direct or indirect address, as further described herein. Various apparatus embodiments are directed to one of the logic nodes 102, 103, 104 (such as the master logic node 102 or one of the slave logic nodes 103, 104), more than one of the logic nodes, and/or the network module 100.

In a number of embodiments, two different types of logic nodes are connected to the management communications bus 105, 107, namely, slave logic nodes 103, 104 and a master logic node 102. The master logic node 102 generates the clock and initiates communications with the slave logic nodes 103, 104. The slave logic nodes 103, 104 receive the clock and respond when addressed by the master logic node 102. Although a single master logic node 102 and two slave logic nodes 103, 104 are illustrated, embodiments are not so limited and can include additional or fewer logic nodes. The master logic node 102 is typically a micro-controller and is called a station management entity (STA) in the IEEE specification. The slave logic nodes 103, 104 are typically Ethernet PHYs, however SMI may also be used to manage other types of circuits as it is a register interface. In some network modules, such as with SMI, there is one master logic node and one more slave logic nodes. However, embodiments are not so limited and other types of modules may include more than one master logic node and/or may not include master/slaves.

In a number of embodiments, the logic nodes may be devices or form part of a device, such as a network-module device. A network-module device, as used herein, refers to or includes a device having MDIO connections to internal logic nodes (or a node) of the plurality of logic nodes of the network module. Each device may include one logic node or multiple logic nodes, with each logic node having one PHY, multiple PHYs and/or multiple subsystems. The slave logic nodes 103, 104 may be on or include separate devices from the master logic node 102, however embodiments are not so limited. For example, the master logic node 102 may be on the same device as the one slave logic nodes 103, 104.

Further, the slave logic nodes 103, 104 may be on the same device, and not separate devices.

One or more of the plurality of logic nodes 102, 103, 104 may include a PHY or multiple PHYs that connect to the data link layer, such as the medium access control (MAC) layer via a media independent interface (MII). A PHY may be a chip, which may include one or multiple PHYs. Larger chips may contain one or more PHY subsystems, each including one or more PHYs. A PHY includes or refers to an individual chip or circuit, as a part of a circuit assembly, or a subsystem (e.g., circuit) of a device (e.g., an SMI slave device having multiple PHYs, such as an IC). The PHYs are configured to implement physical layer functions. Each PHY has its own port address, and, in some embodiments, multiple PHYs are integrated into one device and/or a slave logic node (and/or, optionally, with multiple logic nodes on a device) having one shared SMI interface. Each PHY includes a physical coding sublayer (PCS), a physical media attachment layer (PMA) and/or a physical media dependent layer (PMD), as well as a media-dependent interface (MDI) that connects to the media (e.g., cable). The PMD is an interface between the PMA and the transmission medium through the MDI. The PMD receives serialized bits from the PMA and converts to the appropriate signals for the transmission medium (such as optical signals for a fiber optic line or electrical signals for a copper line), and vice versa. When transmitted to the PMA, the PCS encodes the data to be transmitted into the appropriate code group. When receiving the code groups from the PMA, the PCS decodes the code groups into the data format that can be understood and processed by upper layers. The MII carries signals between the physical layer and the data link layer, such as to a MAC controller. The MII may include a reduced media-independent interface (RMII), gigabit media independent interface (GMII), a reduced gigabit media independent interface (RGIMII), serial gigabit media-independent interface (SGMII), quad serial gigabit media-independent interface (QSGMII), and 10-gigabit media-independent interface (XGMII), among others.

The logic nodes 102, 103, 104 (e.g., the PHY or PHYs internal to the logic nodes) include registers associated with different types of transactions. The different types of transactions are both compliant with the same communications protocol, and include different types of addressing and corresponding commands. For example, the first type of transaction includes direct addressing and the second type of transaction includes indirect addressing. For direct addressing, the address (e.g., the port address and register address) is included in the command with the instruction for the transaction. For indirect addressing, the address (e.g., the register address) is held in an intermediate location that is looked up for the instruction for the transaction. In specific embodiments, the direct addressing includes one command that has the address and the data. For indirect addressing, two commands are used, with the first including the address part (e.g., register address) and the second including the data part.

In accordance with various embodiments, one or more of the logic nodes 102, 103, 104 are used to provide flexible port addressing. For example, one of the logic nodes 103 may include a plurality of ports. The ports may be coupled to circuits that implement different types of functions, such as the illustrated PHYs 111. The logic node 103 further includes an MI controller, such as the illustrated SMI controller 106, and a plurality of shared registers 113. The shared registers 113 are shared between the plurality of PHYs 111 and may be accessed via any of the plurality of ports coupled to the plurality of PHYs 111. The shared registers 113 include a port address table 115 that provides configurable port-address assignments to identify respective ones of the plurality of ports, which are respectively coupled to the plurality of PHYs 111. The port address table 115 may have table addresses identifying a respective PHY (or multiple PHYs on the respective device or more than one logic node for a broadcast) and that are mapped to the port-address assignments.

The SMI controller 106 illustrated by FIG. 1 is a function internal to a slave logic node and/or internal to the device having the slave logic node(s), and that translates SMI transactions to internal register transactions. In some specific embodiments, the SMI controller 106 communicates with the PHYs 111 via an internal interface 110 and accesses one or more of the shared registers 113 associated with the selected one of the plurality of PHYs 111 by configuring or managing, via the internal interface 110, the port-address assignments of the ports within the port address table 115. For example, the SMI controller 106 changes one of the port-address assignments within the port address table. The change may include a broadcast address and/or a port address reassignment and which is responsive to a communication transaction from the master logic node 102. As specific examples, the changes to port address table 115 is used to broadcast, via the management communications bus 105, 107, a communication to a plurality of addressable locations, wherein each of the addressable locations corresponds to one of the a plurality of ports, a subset of the ports, and/or to all of the ports of the logic node. More specifically, the addressable locations correspond to the plurality of PHYs 111 of the logic node, to a subset of the PHYs 111 of the logic node, and/or to each of the plurality of PHYs of the logic node, such as the specific logic node 103 and/or 104. In specific embodiments, the broadcast address may correspond to one or more PHYs in multiple (or all) of the logic nodes of the network module 100.

Each of the ports (e.g., as associated with the plurality of PHYs 111) may have an initial or previous port-address assignment, which may be set by pin-strapping or previously assigned by the SMI controller 106, and the SMI controller 106 changes at least a portion of the initial or previous port-address assignments within the port address table 115. The change may be to a port address that was previously assigned to another PHY of the logic node, although embodiments are not so limited and the change may be to a newly used port address. As an example, the port address table is stored on one or more of the shared registers 113, and the SMI controller 106 changes a port-address assignment associated with at least a first of the plurality ports (e.g., as associated with one or more of the PHYs 111). As further described below, the SMI controller 106 changes the port-address assignment by communicating, in response to a write transaction to one of the port-address assignments associated with one of the plurality ports and associated with the one or more of the shared registers 113 on which the port address table 115 is stored, to the shared registers 113.

The SMI controller 106 thereby configures the port-address assignments within the port address table 115 via a communications transaction (e.g., write command) to the port-address assignment associated with one of the plurality of ports and associated with one or more of the shared registers 113 on which the port address table 115 is stored, such as by communicating a write transaction to a port-address assignment associated with any of the PHYs 111. Although not illustrated by FIG. 1, the communication is initiated by the master logic node 102 and sent to one of the PHYs 111 of the logic node 103 and which is provided to the one or more registers via the internal SMI controller 106. In specific embodiments, the communications transaction is in accordance with the communications protocol and the communications protocol being compliant with an industry standard that defines an Ethernet-based LAN technology (e.g., IEEE 802.3). Additionally, one or more changed addresses may include a broadcast address such as changing at least one of the port-address assignments within the port address table 115 to broadcast, via the management communications bus 105, 107, a communication to a plurality of addressable locations, each of the locations corresponding to one or more of the plurality of ports. The port address may include a new port address, which has not previously been used in the port address table 115 or a previous port-address assignment associated with at least one of the plurality of ports or a broadcast address in the port address table 115, and which is also reassigned.

Another of the logic nodes, e.g., the master logic node 102, may cause the management of the port address table 115 by sending a write transaction to the slave logic node 103, e.g., one of the PHYs 111. For example, the master logic node 102, sometimes referred to as a master SMI controller or STA, determines the port-address assignments and provides a communications transaction to the slave logic node 103, e.g., one of the plurality of PHYs 111, to configure the port-address assignments. For example, the master logic node 102 may change the initial port-address assignments by identifying a unique port address among the initial (or previous) port-address assignments within the network module 100 and changing at least one of the initial port-address assignments. The master logic node 102, more specifically, changes the port-address assignment, by sending a write transaction to the SMI controller 106 of the slave logic node 103n that identifies a port-address assignment associated one or more of the shared registers 113 on which the port address table 115 is stored. In response, the SMI controller 106 communicates the write transaction to the one or more of the shared register 113 via an addressed one of the PHYs 111. For example, the SMI controller 106 is a circuit that is internal to the slave logic node 103 and that provides a function to translate SMI transactions to internal register transactions. The SMI controller 106 identifies the port address in the management frame sent by the master logic node 102, at 108, and compares the port address in the management frame to the port address table 115. The stored port addresses are directly available to the (slave) SMI controller 106 for comparison (e.g., does not involve a transaction on the internal register interface). The port address table 115 maps the respective port address to a port associated with a PHY (or multiple) of the plurality of PHYs 111.

More specifically, FIG. 1 illustrates a specific example of port-address assignment and port addressing using the SMI controller 106 and related to PHYs 111. The port addresses for the PHYs 111 and the broadcasts used for the PHYs 111 are stored in the shared register space via a port address table 115. The SMI controller 106 extracts the port address of an incoming MDIO transaction, at 108, and compares this with the port addresses in the port address table 115, at 109. If there is a match, the corresponding port number (PortNr) is selected. If there is no match, none of the PortNrs is selected and the logic node 103 does not respond to this MDIO transaction. For a match on a broadcast, multiple PortNrs may be selected. By writing to the register address in the shared register space (e.g., the shared registers 113) that contains a port address associated with one PHY, multiple PHY, and/or multiple PHYs associated with multiple logic nodes, sometimes herein referred to as a "broadcast address," the port addresses can be changed. The shared registers 113 can be accessed when at least one of the PortNrs is selected. The register transaction, using any of the port addresses or broadcast address(es) in the port address table 115 and addressing the registers in MMD30L, reaches the same shared registers 113.

Various embodiment are directed to assigning port addresses as a broadcast address associated with one or more of the PHYs 111 of the logic node and/or PHYs associated with more than one logic node of the network module. Broadcasting on multi-port devices can allow for SMI access to all PHYs in a subsystem simultaneously and/or sub-portions of the PHYs across multiple devices. A broadcast write transaction may change the same register for all addressed PHYs simultaneously, and which may be useful for initialization after power-up. A broadcast read transaction may involve a bit-wise OR of all PHY responses, access of the shared address space only (otherwise zero response), or may not be allowed (e.g., → zero response). Broadcast may be disabled at start-up and there is no impact when not used. If multiple slave logic nodes, connected to SMI, share the same broadcast address, a broadcast transaction is accepted by the multiple slave logic nodes. Different slave logic nodes can have different broadcast addresses to access only PHYs of one slave logic node or PHYs of a subsystem(s) with a broadcast transaction (and/or subsets of PHYs of multiple logic nodes). This can be accomplished with adaptable broadcast addresses. The default (e.g., manufacturer set) broadcast address may be 00000, and is stored in a shared registers 113, which are shared for all PHYs of a logic node. In a specific example, this shared register section is the lower half of MMD 30. The broadcast address is reconfigurable via a unique PHY address of a logic node or PHY subsystem, including an address that is used by any other logic node on the management communications bus.

As may be appreciated, the network module (which may form part of the LAN) may involve communications in accordance with a communications protocol and which involves first and/or second types of transactions, such as Clause 22 and Clause 45 transactions in accordance with IEEE 802.3

Clause 22 transactions involve direct addressing for read and write operations. The frame fields in the data frames include:

PRE: a preamble frame field which is "1" for thirty-two clock cycles

ST: start-of-frame, which is fixed to "01"

OP: operation code which identifies read or write operation (with 10 include read and 01 including write)

PHYAD: a five bit (PHY) port address

REGAD: a five bit register address

TA: turn-around (hand over for read and filler for writes)

DATA: sixteen bit register value (e.g., data).

Clause 45 transactions involve indirect addressing. Four example data frames include a first for an address part of a read or write transaction, a second for a read operation, a third for a write operation, and a fourth for post-read increment addressing in accordance with Clause 45 of IEEE 802.3. The frame fields in the data frame include:

PRE: a preamble frame field which is "1" for thirty-two clock cycles

ST: start-of-frame, which is fixed to "00"

OP: operation code which identifies address, read or write operation (with 00 being write an address, 10 including read, 01 including write, and 11 including read and increment address)

PRTAD: a five bit (PHY) port address

DEVAD: a five bit MDIO-manage device (MMD) number

DATA: sixteen bit address or register value (e.g., data)

The ST identifies whether the transaction is Clause 22 or Clause 45. For a clause 45 transaction, the address is not include in the data/write commands. The address can be addressed per MMD and is set by a separate (address) command. The data read/write operations are directed to this address. The address space for Clause 45 is sixteen bit wide (e.g., 65536 registers).

Figure 2A:
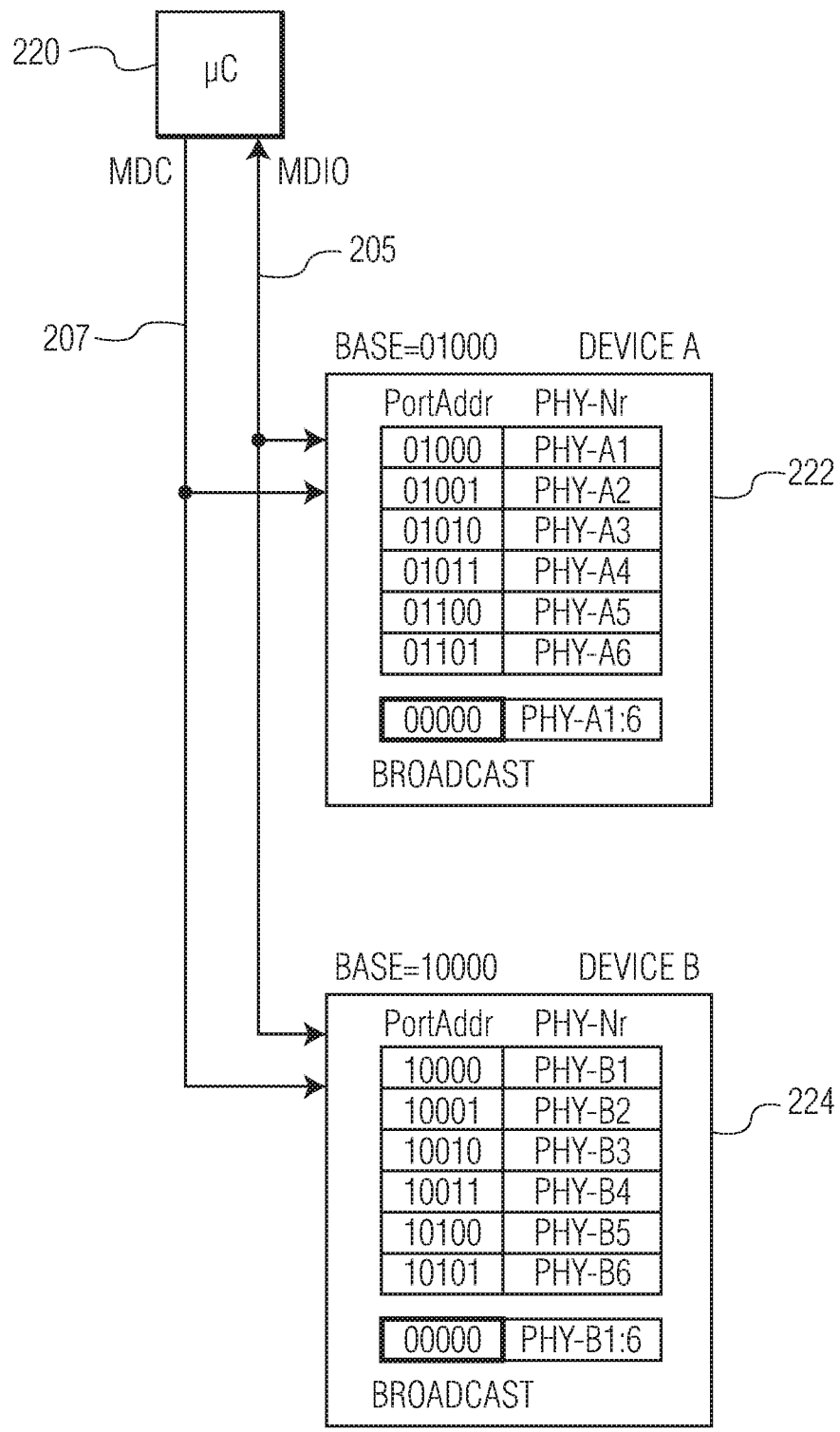
FIGS. 2A-2B illustrate specific examples of managing port-address assignments of an apparatus, in accordance with the present disclosure.
Figure 2B:
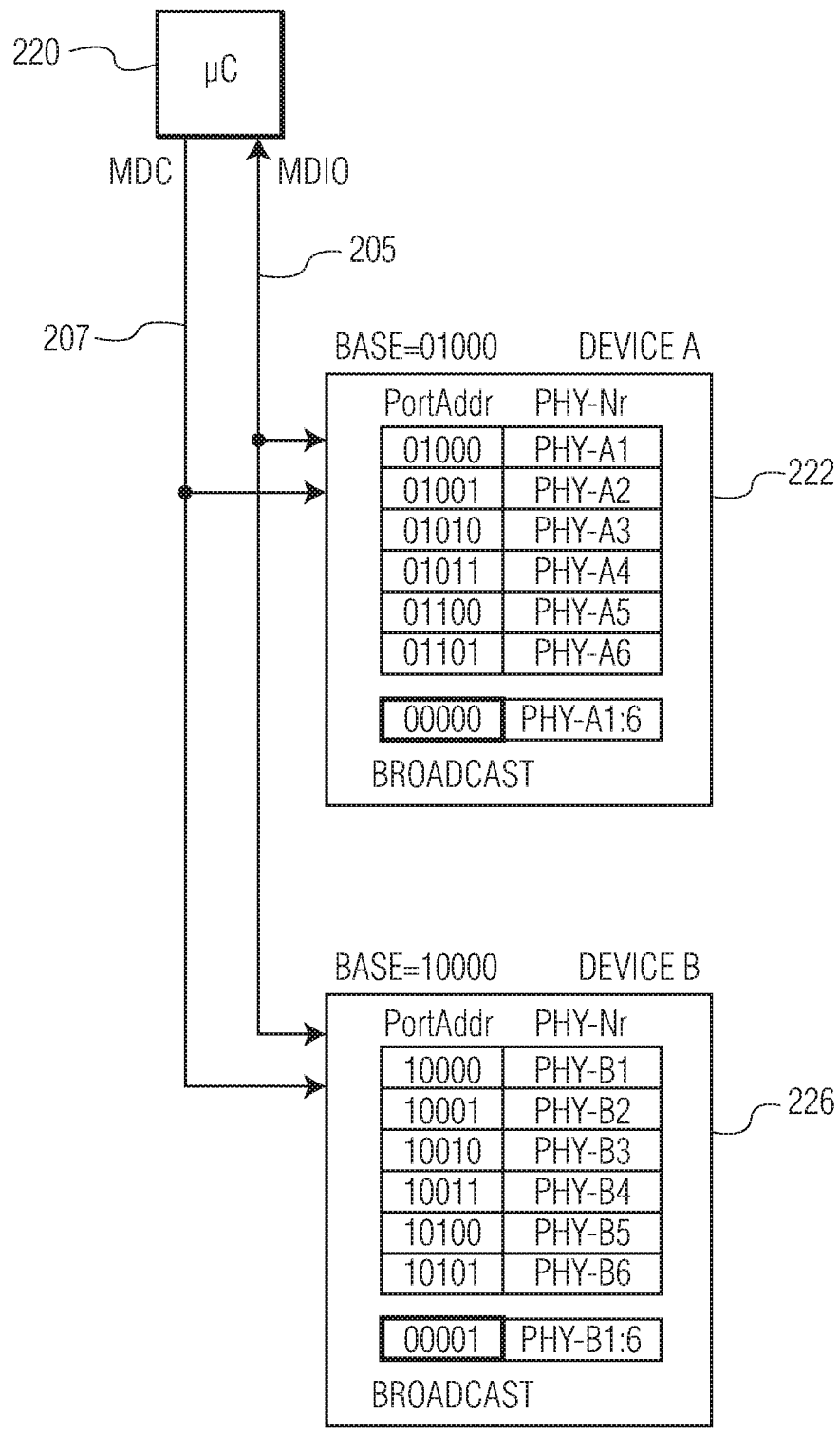

FIGS. 2A-2B illustrates specific examples of managing port-address assignments of an apparatus, in accordance with the present disclosure. The apparatus includes a microcontroller 220 used to management port addresses of the devices 222, 224 (e.g., slave logic nodes) connected to the microcontroller 220 by a management communications bus 207, 205. The microcontroller 220 illustrated by FIGS. 2A-2B may include the previously described master logic node 102 for communicating to slave logic nodes 103, 104 as illustrated and described in connection with FIG. 1. The illustrated devices 222, 224 may each include a slave logic node or many slave logic nodes (e.g., include PHYs or sub-systems of a device having many slave logic nodes), such as the slave logic nodes illustrated by FIG. 1. Similarly, the management communications bus 207, 205 may include an MDIO 205 and MDC 207.

A broadcast address identifies multiple PHYs, such as associated with one or more of the devices 222, 224, and/or PHY subsystems via the management communications bus 205, 207. The broadcast is not restricted to a fixed address or specifically address 00000, and may include any unique port address that maps to the multiple PHYs and/or PHY subsystems in the port address table. A broadcast can be used if there is a port address available that is not used for a specific port. Broadcast address re-assignment also enables using different broadcast addresses to reach different groups of PHYs, such as on one or more of the devices 222, 224.

As shown on FIG. 2A, a transaction to broadcast address 00000 reaches all PHYs in the devices 222, 224. FIG. 2A may include port-address assignments during an initial boot, such as initial port-address assignments. The port address may be reassigned, for example, as shown by FIG. 2B, device B 224 has a different broadcast address assigned after an initial boot, and a transaction to broadcast address 00000 only reaches PHYs in device A 222 and a transaction to broadcast address 00001 only reaches PHYs in device B 224. Additionally illustrated are the port-number assignments for the PHYs, which illustrates table addresses, sometimes herein referred to as port numbers (e.g., PHY-A1, PHY-A2, and so on) mapped to assigned port addresses (e.g., PHY-A1 is assigned port address 01000 in FIG. 2A and FIG. 2B). The initial port addresses may be based on pin-strapped base address and incremental addressing of PHYs in subsystem.

Figure 3:
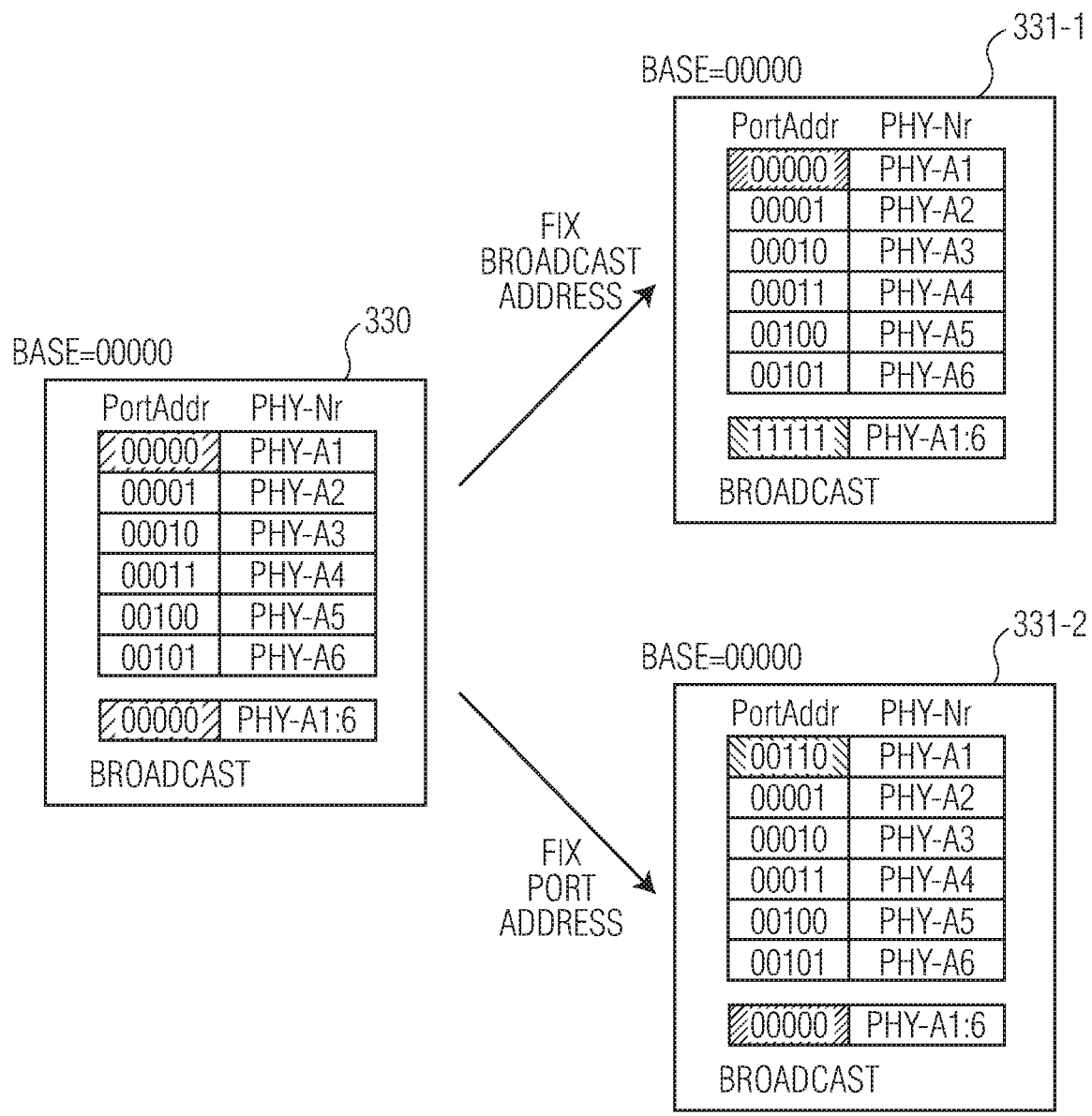
FIG. 3 illustrates another specific example of managing port-address assignments of an apparatus, in accordance with the present disclosure.

FIG. 3 illustrates another specific example of managing port-address assignments of an apparatus, in accordance with the present disclosure. More specifically, FIG. 3 illustrates an example port address table 330 directly after power-up or a reboot, and example revised port address tables 331-1, 331-2 after reboot and reassignment. The revised port address tables 331-1, 331-2 are not intended to be limiting and rather illustrate various examples. In each of the revised port address tables 331-1, 331-2, the respective table address remain the same (e.g., PHY-A1 is the same PHY in each port address table) with the port addresses or broadcast addresses changing.

The default broadcast address can be 00000 without causing any limitation. By default, broadcast address usage is disabled at boot time. If a port address conflicts with the disabled broadcast address at boot time, either the conflicting port address or the broadcast address can be fixed by address re-assignment before enabling broadcast as shown by FIG. 3.

For logic nodes including multiple PHYs, embodiment may include or be directed to clustering PHYs of the same type in a subsystem with its own broadcast address to optimize the benefits of broadcasting. This allows, for example, to assign the same broadcast address to multiple PHYs and/or PHY subsystems with the same type of PHYs in multiple logic nodes to enable addressing all PHYs (and across multiple of devices) of the same type using that broadcast address. Freedom to selective address sets of PHYs with broadcasting is achieved when every PHY port has a broadcast address, which can be modified or disabled to form broadcast groups as desirable, as illustrated further by FIG. 7.

Figure 4A:
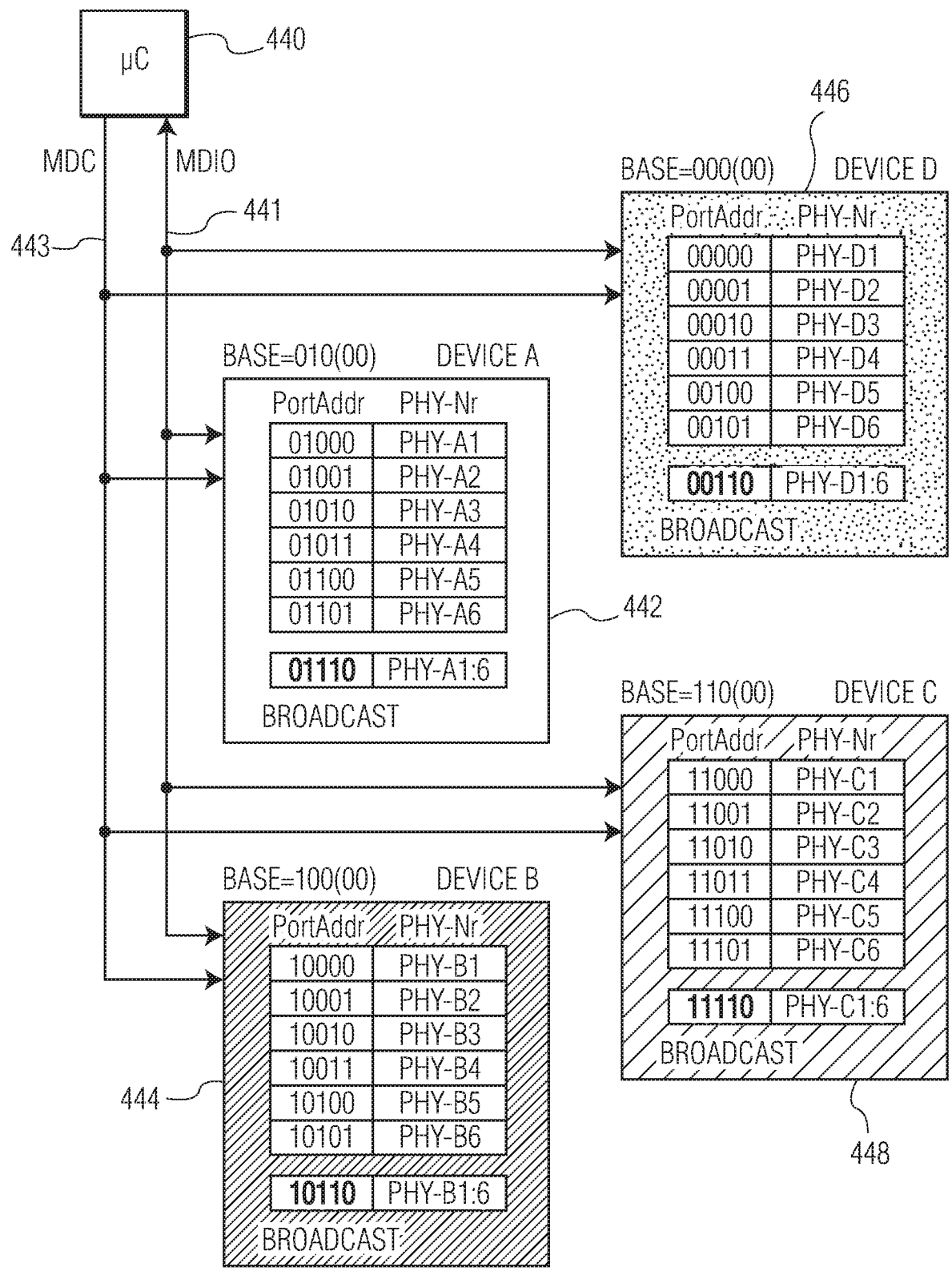

FIGS. 4A-4B illustrate a specific example of managing port-address assignments of an apparatus and a port address table, in accordance with the present disclosure. As shown by FIG. 4A, and similarly to FIGS. 2A-2B, the apparatus may include a microcontroller 440 used to management port addresses of the devices 442, 444, 446, 448 (e.g., slave logic nodes) connected to the microcontroller 440 by a management communications bus 441, 443. The microcontroller 440 illustrated by FIG. 4A may include the previously described master logic node 102, and including an SMI, for communicating to slave logic nodes 103, 104 as illustrated and described in connection with FIG. 1. The devices 442, 444, 446, 448 illustrated may each include a slave logic node or multiple slave logic nodes, such as the slave logic nodes illustrated by FIG. 1. The management communications bus 441, 443 includes an MDIO 441 and MDC 443.

In the example embodiment, there are four slave logic nodes or devices (e.g., devices 442, 444, 446, 448 which may be slave logic nodes), with each having six PHYs. As an example, the six PHYs of device A 442 are identified by the table addresses (sometimes herein referred to as port numbers) of PHY-A1, PHY-A2, PHY-A3, PHY-A4, PHY-A5, PHY-A6. Each of the devices has a broadcast address which is used to broadcast a communications transaction to all six PHYs via the management communications bus 441, 443 and the master logic node (e.g., the microcontroller 440). Each device has three pin-straps to set the base address. Although FIGS. 4A-4B illustrates the devices as separate devices, in various embodiments two or more of the devices are sub-system of a single device.

In a number of embodiments, the master logic node (e.g., the microcontroller 440) re-assigns the broadcast address to have a separate broadcast address per device or slave logic node. As shown, the re-assignment may additionally include re-assigning respect port addresses associated with the PHYs, such that the port address are unique between the respective PHYs of each of the devices 442, 444, 446, 448 and the broadcast addresses. In the specific example illustrated by FIGS. 4A-4B, two pin-straps are used for base address assignment, and all broadcast addresses are re-assigned to a value that is one higher than the highest port address in the respective device, as shown by the resulting port address table 449. However, embodiments are not so limited and a variety of different re-assignments may occur.

Figure 5A:
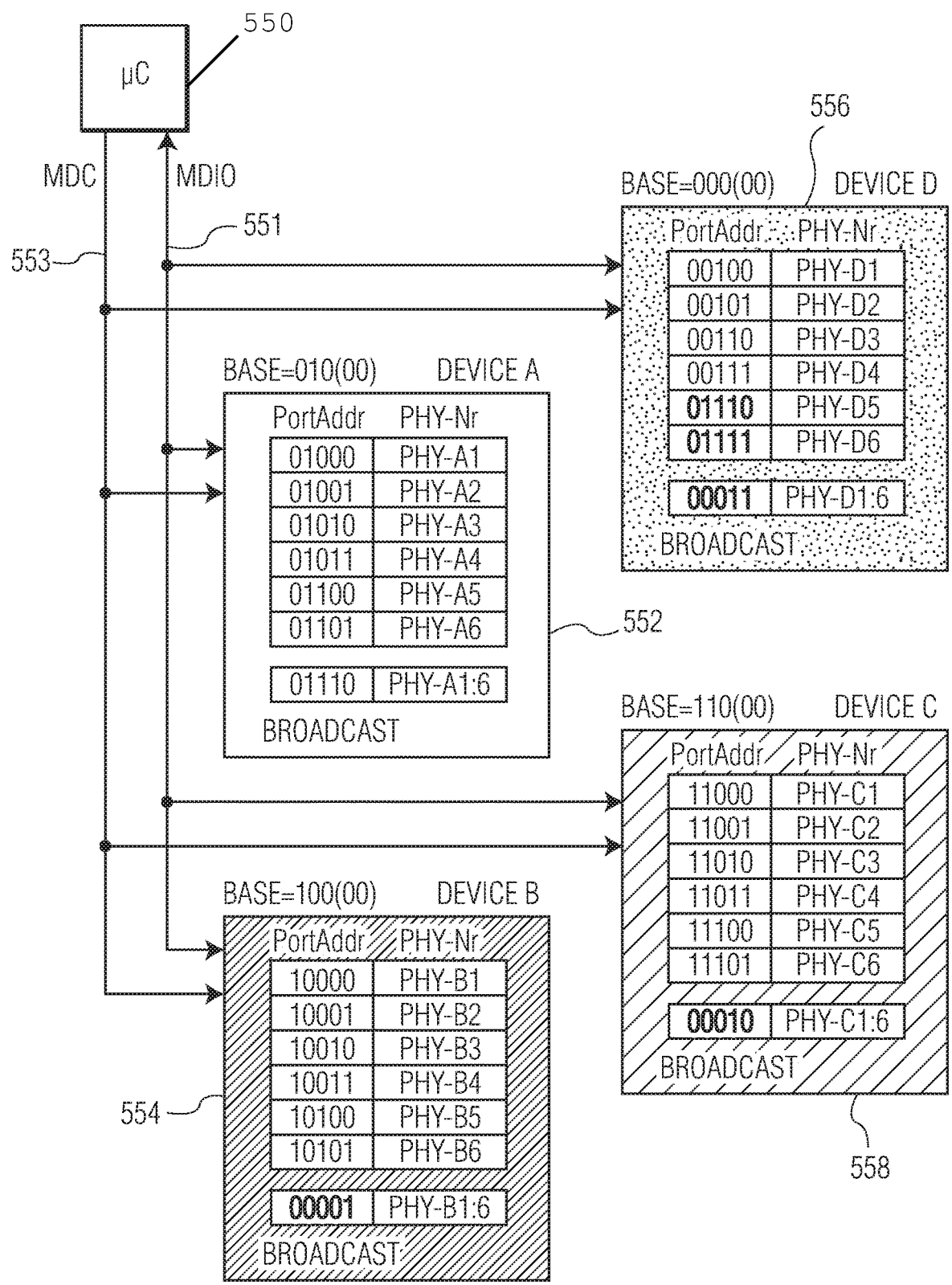

FIGS. 5A-5B illustrates another specific example of managing port-address assignments and a port address table, in accordance with the present disclosure. As shown by FIG. 5A, the apparatus may include a microcontroller 550 used to management port addresses of the devices 552, 554, 556, 558 connected to the microcontroller 550 by a management communications bus 551, 553. The microcontroller 550 illustrated by FIG. 5A may include the previously described master logic node 102 for communicating to slave logic nodes 103, 104 as illustrated and described in connection with FIG. 1. The devices 552, 554, 556, 558 illustrated may each include a slave logic node or may include multiple slave logic nodes, such as the slave logic nodes illustrated by FIG. 1. The management communications bus 551, 553 includes an MDIO 551 and MDC 553.

Similarly to FIGS. 4A-4B, there are four slave logic nodes or devices (e.g., devices 552, 554, 556, 558) and each have six PHYs (e.g., PHY-A1, PHY-A2, PHY-A3, PHY-A4, PHY-A5, PHY-A6 of device 552). Each of the slave logic nodes or devices has a broadcast address which is used to broadcast a communications transaction to all six PHYs via the management communications bus 551, 553 and the master logic node (e.g., the microcontroller 550).

In a number of embodiments, the master logic node (e.g., the microcontroller 550) re-assigns the broadcast address to have a separate broadcast address per device. In the example specifically illustrated by FIGS. 5A-5B, the broadcast addresses are clustered at the lowest addresses and the base address of device D 556 is set to 00100, to leave space for re-broadcast addresses re-assignment of devices B, C, and D to address 00000 to 00011. However, in this example there are also port address conflicts after boot for PHY-D5 and PHY-D6 which are overlapping with the port addresses of PHY-A1 and PHY-A2. With port address re-assignments of PHY-D5 and PHY-D6 to address 01110 and 01111, which are unused addresses between the port address range used by device A and device B 552, 554, the port address map becomes consistent, as shown by the revised port address table 559.

Embodiments are not limited to the revised port addresses, including PHY port addresses and broadcast addresses, as illustrated by FIGS. 4A-5B. As the port addresses can be changed at any moment in time, embodiments are directed to changing broadcast addresses to vary the set of PHYs that is reached by a broadcast transaction.

Figure 6:
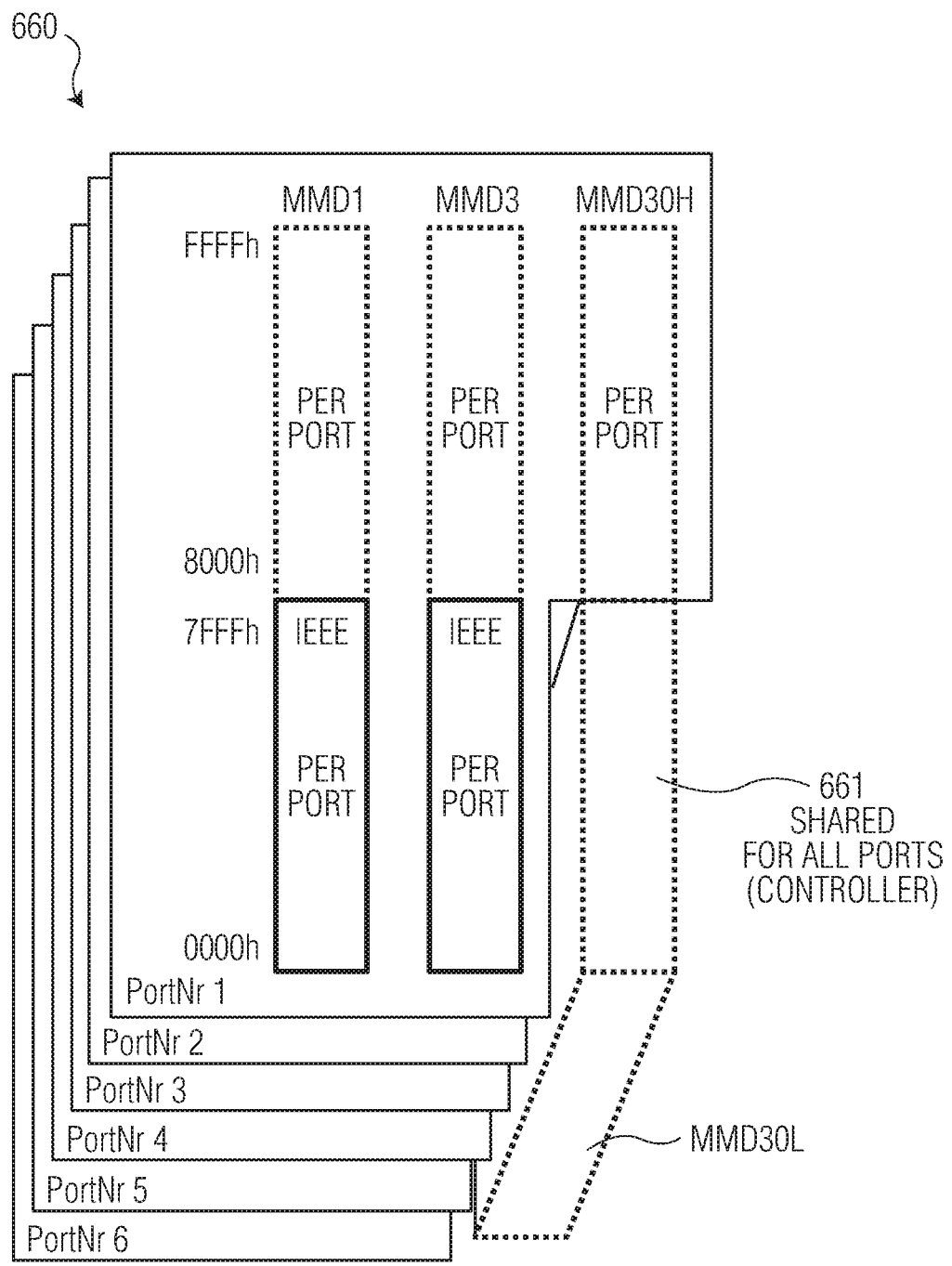
FIG. 6 illustrates an example of a register map for a specific logic node, in accordance with the present disclosure.

FIG. 6 illustrates an example of a register map for a specific logic node, in accordance with the present disclosure. As previously described, a logic node may include a plurality of PHYs, such as the illustrated example of six PHYS and with each PHY having multiple MMDs as shown by the register map 660 for the PHYs. The port address table is stored in the shared registers 661 for all ports of the logic node such that the port addresses may be managed by SMI.

As the port address table is stored on the shared registers 661, the table may be accessed by SMI using any of the port addresses in the table and as associated with the logic node. A PHY port responds to transactions if the port address stored for this PHY in that register sector matches the port address of the transaction. A port address, such as of a PHY, also responds to transactions if the broadcast address stored for this PHYs matches the port address of the transaction and broadcast is enabled. The port address of a PHY may be modified by writing a new (or revised) port address value to the register that contains the port address of the PHY. After completion of the write transaction, the PHY ignores transactions to its old port address and respond to transactions to its new port address. Similarly, a broadcast address can be modified.

If two or more completely independent PHY subsystems are integrated in one device, but without a common port address table in a register sector that is shared between all these subsystems, these subsystems can be considered multiple logic nodes or devices in accordance with various embodiments. The multiple independent PHY subsystems may share the same SMI pins.

The register map 660 illustrated by FIG. 6 may include a Clause 45 register map to manage Ethernet PHYs. As described above, the register map 660 illustrates an example having six PHYs, each including three MMDs, however embodiments are not so limited and the number of PHYs and number of MMDs are scalable. The registers in the lower address range of MMD30 are used here as shared registers, which are accessible using any port address or broadcast address that is assigned to the PHY subsystem. The port address table and broadcast address are stored in this shared register sector.

Figure 7:
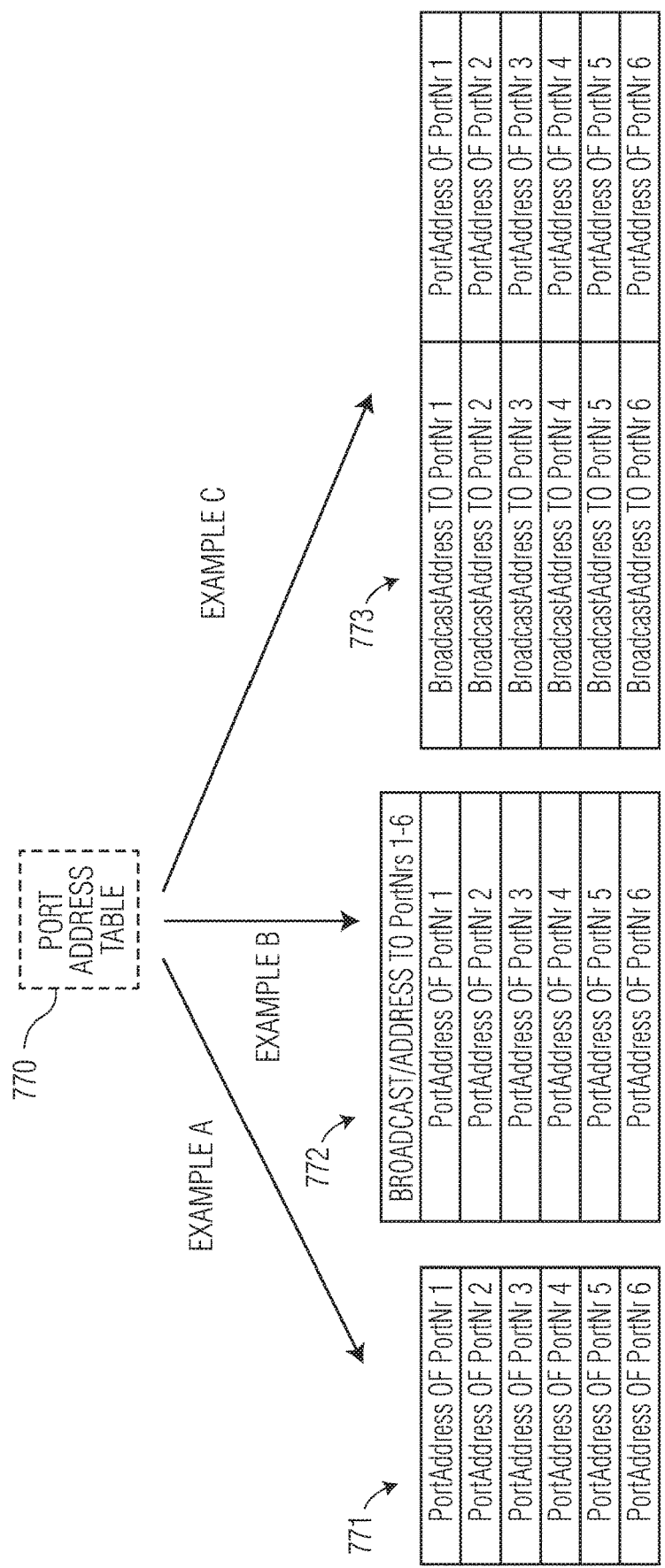
FIG. 7 illustrates another specific example of managing port-address assignments and resulting port address tables, in according with the present disclosure.

FIG. 7 illustrates another specific example of managing port-address assignments and resulting port address tables, in according with the present disclosure. For example, FIG. 7 illustrates example formats for port address tables 770, 771, 772, 773.

In example A, the table 771 contains port addresses for all PortNrs in the subsystem, without support for a broadcast address. In example B, the table 772 contains port addresses for all PortNrs in the subsystem, plus a broadcast address for all PortNrs in the subsystem. In example C, the table 773 contains port addresses and broadcast addresses for all PortNrs in the subsystem. Table 773 allows for assigning different broadcast addresses to different PortNrs within the subsystem. Because subsystems may only contain PHYs of the same type, example B that includes table 772 provide sufficient flexibility in most cases.

Figure 8:
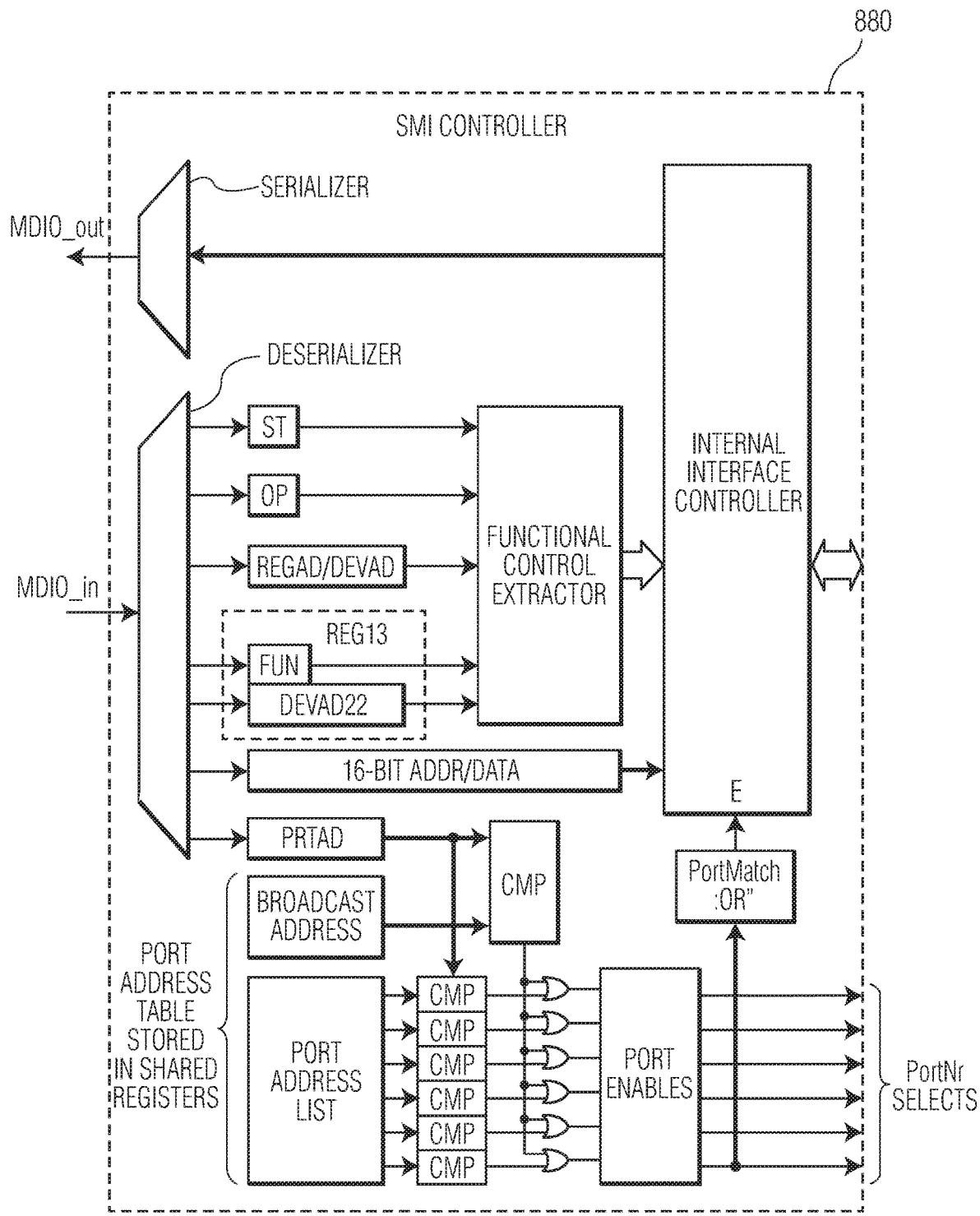
FIG. 8 illustrates an example interface controller of a logic node, in accordance with the present disclosure.

FIG. 8 illustrates an example interface controller of a (slave) logic node, in accordance with the present disclosure. More specifically, the MI controller is an SMI controller that is coupled to or includes an interface (e.g., SMI) (not illustrated). Although embodiments are not limited to SMI. The SMI includes the previously described two wire interface including a MDIO and MDC and a tri-state driver that is present on all devices. The MDIO is a passive resistive pull-up and all slave logic nodes listen to and only the addressed port responds. Addressed slave logic nodes (only), drive the MDIO during read responses. The interface is connected to an SMI controller 880 and used to control the communications to different PHYs and/or registers. Typically, there is one SMI controller and interface per slave logic node and/or device (e.g., network-module device) and not separate SMI controller and interface per subsystem. As may be appreciated, logic nodes may have multiple SMI functions on a single device and a single SMI interface may address multiple PHY ports.

The serial MDIO transaction is de-serialized and decomposed into the different fields of the frame. The port address of the transaction is compared with the port addresses in the port address table and the broadcast address. This example implementation has one shared broadcast address for all ports in the sub-system. If there is an address match detected, the transaction proceeds via an internal interface to the registers. Note that the port address list and broadcast address are located in the shared register space, which makes them accessible via SMI.

In various embodiments, MDIO_IN and MDIO_OUT of the SMI controller 880 is unidirectional and the MDIO pin is bidirectional. MDOE is an enable signal to select when the driver IO is driving the MDIO pin based on the MDO signal value. This MDOE signal gets only asserted in a slave logic node when it needs to drive the MDIO pin during a read transaction. Otherwise the driver is tri-stated and the IO is used to monitor the incoming signal on MDIO_IN.

Although the above describes PHYs and SMI, embodiments are not so limited and may include logic nodes having one or more ports coupled to circuits that implement different types of functions which may be implemented in response to communications over the management communication bus or other types communications.

The above-described apparatus may be used to implement a variety of methods. An example method is use within a LAN characterized by a plurality of network modules configured to convey data over a physical communication channel and with at least one of the network modules including a management communications bus for communication among a plurality of logic nodes via a communications protocol. The method includes communicating over the management communications bus among the plurality of logic nodes. The method further includes providing a port address table having configurable port-address assignments which identify respective ones of a plurality of ports and one or more shared registers, the plurality of ports being associated with the one or more shared registers, and accessing, via communication with the plurality of ports, at least one register via a selected one of the plurality of ports and configuring or managing the port-address assignments within the port address table. Accessing the ports may include communicating a write transaction to the one or more of the shared registers, wherein the one or more shared registers store the port address table, and therein, changing at least one of the port-address assignments in the port address table associated with one (or more) of the plurality of ports.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Various embodiments are implemented in accordance with the underlying U.S. Patent Application (application Ser. No. 16/456,111 entitled "Apparatuses and Methods Involving First Type of Transaction Registers Mapped to Second Type of Transaction Addresses," filed Jun. 28, 2019, which is fully incorporated herein by reference for its general and specific teachings. For instance, embodiments herein and/or in the provisional application may be combined in varying degrees (including wholly). As a specific example, the above-described apparatuses and/or methods may include first type of transaction registers that are mapped to the second type of transaction addresses, such as illustrated by FIGS. 2A-2B and 4. Embodiments discussed in the Patent Application are not intended, in any way, to be limiting to the overall technical disclosure, or to any part of the claimed disclosure unless specifically noted.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, and/or other circuit-type depictions (e.g., reference numerals 106 and 220 of FIGS. 1 and 2A depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown herein. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described herein is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the method embodiments described herein may be carried out by any of the described apparatuses. Such modifications do not depart from the true spirit and scope of various aspects of the disclosure, including aspects set forth in the claims.

What is claimed is:

1. An apparatus for a local area network characterized by a plurality of network modules to convey data over a physical communication channel and with at least one of the network modules including a management communications bus for communication among a plurality of logic nodes via a communications protocol, the apparatus comprising at one of the plurality of logic nodes,
    a plurality of ports to provide communication;
    a plurality of shared registers having a port address table to provide configurable port-address assignments that identify respective ones of the plurality of ports and the port address table being associated with at least one broadcast address to identify multiple ports across one or more of the plurality of logic nodes; and
    a management interface controller to communicate with the plurality of ports and to access at least one register of the plurality of shared registers, via a selected one of the plurality of ports, and in response to configure or manage the port-address assignments within the port address table.

2. The apparatus of claim 1, wherein the port address table is stored via one or more of the shared registers, and the apparatus further including a master logic node of the plurality of logic nodes, wherein the master logic node is to change one of the port-address assignments within the port address table to broadcast via the management communications bus a communication to a plurality of addressable locations, wherein each of the addressable locations corresponds to one of the plurality of ports, one or more of the plurality of ports being associated with PHYs that provide a physical layer function.

3. The apparatus of claim 1, further including a master logic node of the plurality of logic nodes, wherein the master logic node is to change one of the port-address assignments within the port address table to broadcast, via the management communications bus, a communication to a subset of the plurality of ports.

4. The apparatus of claim 1, further including a master logic node of the plurality of logic nodes, wherein the master logic node to change one of the port-address assignments within the port address table to broadcast, via the management communications bus, a communication to each of the plurality of ports.

5. The apparatus of claim 1, wherein each of the plurality of ports have an initial port-address assignment and the apparatus further includes a master logic node of the plurality of logic nodes, wherein the master logic node is to change at least a portion of the initial port-address assignments.

6. The apparatus of claim 1, wherein the port address table is stored on one or more of the shared registers, and the apparatus further includes a master logic node of the plurality of logic nodes, wherein the master logic node is to change the port address-assignments associated with at least a first of the plurality of ports within the port address table to another port-address.

7. The apparatus of claim 6, further including a master logic node of the plurality of logic nodes, wherein the master logic node is to change the port-address-assignment by communicating a write transaction to one of the port-address assignments associated with one of the plurality of ports and associated with the one or more of the shared registers on which the port address table is stored.

8. The apparatus of claim 1, further including a master logic node of the plurality of logic nodes, wherein the master logic node is to configure the port-address-assignments within the port address table via a communications transaction to one of the plurality of ports and associated with one or more of the shared registers on which the port address table is stored.

9. The apparatus of claim 1, wherein each of plurality of ports has an initial port-address assignment and the apparatus further includes a master logic node that is to identify a unique port address among the initial port-address assignments and to change at least one of the initial port-address assignments.

10. An apparatus for a local area network characterized by a plurality of network modules to convey data over a physical communication channel and with at least one of the network modules including a management communications bus for communication among a plurality of logic nodes via a communications protocol, the apparatus comprising at one of the plurality of logic nodes,
a plurality of ports to provide communication;
a plurality of shared registers having a port address table to provide configurable port-address assignments that identify respective ones of the plurality of ports;
a management interface controller to communicate with the plurality of ports and to access at least one register of the plurality of shared registers, via a selected one of the plurality of ports, and in response to configure or manage the port-address assignments within the port address table; and
the apparatus further including a master logic node of the plurality of logic nodes, wherein the master logic node is to manage the plurality of logic nodes via a Serial Management Interface as specified by the communications protocol, the communications protocol being compliant with an industry standard that defines an Ethernet-based local-area network (LAN) technology, by changing at least one of the port-address assignments within the port address table and to broadcast, via the management communications bus, a communication to a plurality of addressable locations, each of the addressable locations corresponding to one of the plurality of logic nodes.

11. The apparatus of claim 10, wherein the changed at least one of the port-address assignments includes a new port address.

12. The apparatus of claim 10, wherein the changed at least one of the port-address assignments includes a previous port-address assignment associated with at least one of plurality of ports in the port address table.

13. The apparatus of claim 10, wherein the master logic node changes the port-address assignment by communicating a write transaction to a port-address assignment associated with any of the plurality of ports.

14. An apparatus for a local area network characterized by a plurality of network modules to convey data over a physical communication channel and with at least one of the network modules including a management communications bus for communication among a plurality of logic nodes via a communications protocol, the apparatus comprising at one of the plurality of logic nodes,
a plurality of ports to provide communication;
a plurality of shared registers having a port address table to provide configurable port-address assignments that identify respective ones of the plurality of ports;
a management interface controller to communicate with the plurality of ports and to access at least one register of the plurality of shared registers, via a selected one of the plurality of ports, and in response to configure or manage the port-address assignments within the port address table; and
the apparatus further including the management communications bus for communication among the plurality of logic nodes and wherein the plurality of logic nodes include a master logic node and a plurality of slave logic nodes, and wherein the one of the plurality of logic nodes includes one of the slave logic nodes having the plurality of ports, the plurality of shared registers and the management interface controller.

15. The apparatus of claim 14, wherein the master logic node is to change the port-address assignment by sending a write transaction to the slave logic node, wherein the write transaction is associated with one or more of the shared registers on which the port address table is stored, and the management interface controller of the one slave logic node communicates the write transaction to the one or more of the shared registers.

16. The apparatus of claim 14, further including each of the plurality of logic nodes, wherein each of the slave logic nodes includes respective one or more ports and a plurality of shared registers having a port address table to provide configurable port-address assignments to identify respective ports associated with each of the slave logic nodes and master logic node is to change at least one of the port-address assignments within ones or more of port address tables to broadcast, via the management communications bus, a communication to a plurality of addressable locations, wherein each of the addressable locations corresponds to one of the ports of one or more of the slave logic nodes.

17. The apparatus of claim 14, wherein-each of the slave logic nodes includes respective one or more ports and a plurality of shared registers having a port address table to provide configurable port-address assignments to identify respective ones of the plurality of ports, wherein the master logic node is to change one of the port-address assignments within the port address table in order to broadcast, via the management communications bus, a communication to a subset of ports of more than one of the slave logic nodes.

18. A method for use within a local area network characterized by a plurality of network modules configured to convey data over a physical communication channel and with at least one of the network modules including a management communications bus for communication among a plurality of logic nodes via a communications protocol and in response to communications sent over the management communications bus, the method comprising:

communicating over the management communications bus among the plurality of logic nodes;

at one of the plurality of logic nodes, the one logic node having a plurality of ports, providing, on one or more of a plurality of shared registers, a port address table having configurable port-address assignments which identify respective ones of the plurality of ports and the port address table being associated with at least one broadcast address to identify multiple ports across one or more of the plurality of logic nodes; and accessing, via communication with the plurality of ports, at least one register associated with a selected one of the plurality of ports and configuring or managing the port-address assignments within the port address table.

19. The method of claim 18, wherein accessing the at least one registers includes communicating a write transaction to one or more of the plurality of shared registers, wherein the one or more of the shared registers stores the port address table, and therein, changing at least one of the port-address assignments in the port address table associated with one of the plurality of ports of the logic node of the network module.

20. The method of claim 19, wherein changing the at least one of the port-address assignments within the port address table includes selecting a broadcast address, via the management communications bus, that provides a communication to a plurality of addressable locations corresponding to subsets of the plurality of logic nodes of the network module.

* * * * *